(No Model.)

W. R. HILL.
EGG CUP AND COOKER.

No. 499,426. Patented June 13, 1893.

WITNESSES:
J. J. Laass
C. L. Bendixon

INVENTOR:
William R. Hill
BY E. Laass
his ATTORNEY.

UNITED STATES PATENT OFFICE.

WILLIAM R. HILL, OF SYRACUSE, NEW YORK, ASSIGNOR OF ONE-HALF TO WILLIAM S. FARRINGTON, OF SAME PLACE.

EGG CUP AND COOKER.

SPECIFICATION forming part of Letters Patent No. 499,426, dated June 13, 1893.

Application filed March 13, 1893. Serial No. 465,702. (No model.)

*To all whom it may concern:*

Be it known that I, WILLIAM R. HILL, of Syracuse, in the county of Onondaga, in the State of New York, have invented new and useful Improvements in Egg Cups and Cookers, of which the following, taken in connection with the accompanying drawings, is a full, clear, and exact description.

This invention relates to the class of egg-cups which are egg-shaped and is designed for cooking therein the eggs divested of their shells, and maintained approximately in their original shape during the process of cooking; and the invention consists in an improved construction of the cover of the cup and means for supporting it during the process of cooking the egg and for serving the cooked egg in said cup on the table, as hereinafter fully described and specifically set forth in the claims.

Figures 1, 2:
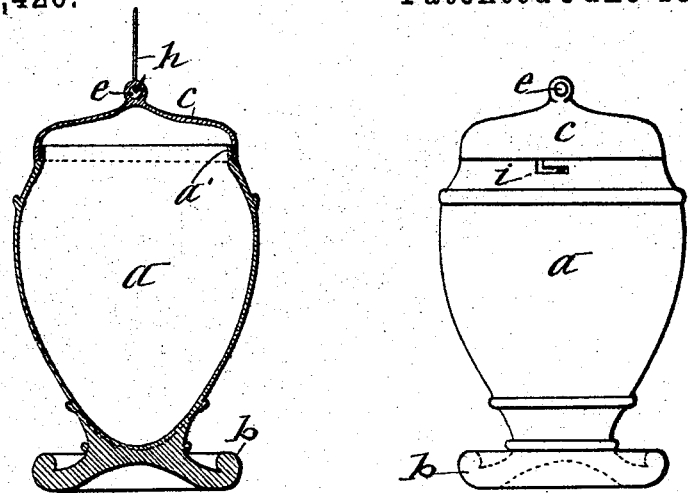
Figure 3:
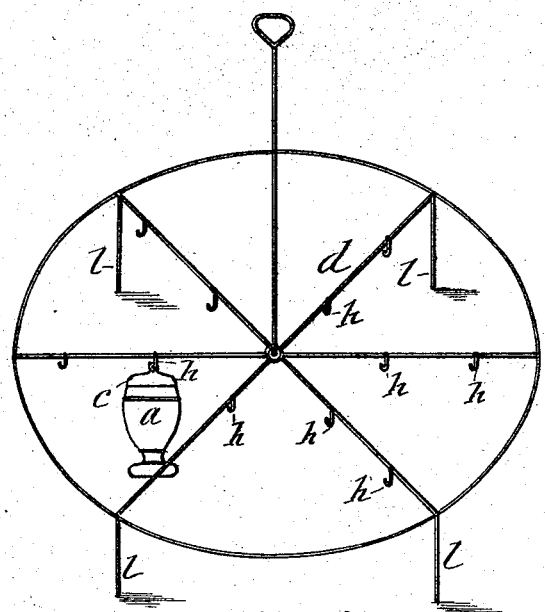

In the annexed drawings Figure 1 is a side view of an egg-cup embodying my invention. Fig. 2 is a vertical transverse section of the same, and Fig. 3 is an isometric perspective view of the spider by which to suspend the cups in the vessel in which the egg is to be cooked.

Similar letters of reference indicate corresponding parts.

*a*— represents the egg-receptacle or cup proper which may be of any suitable material and is formed egg-shaped internally so as to maintain the egg approximately in its original shape while being cooked.

*c*— denotes the cover which is detachably secured to the annular rim —*a'*— on the top of the receptacle either by being screwed onto said rim, as represented in Fig. 2 of the drawings, or by a bayonet joint —*i*—
as shown in Fig. 1 of the drawings, or by any suitable interlocking coupling to allow the receptacle —*a*— to be lifted by its cover, for which purpose I provide the top of said cover with an eye —*e*— adapted to receive a hook —*h*— by which to either lift the cup out of the kettle or suspend it therein so as to maintain the cup with its longer axis in a vertical position and out of contact with the bottom of the kettle and thus cook the egg uniformly and without disturbing the relative positions of the yelk and white of the egg, the egg being deprived of its shell when introduced into the cup, and the latter serving the purpose of the shell during the process of cooking the egg.

For suspending the cup in the kettle I prefer to employ the spider —*d*— shown in Fig. 3 of the drawings, said spider being provided with legs —*l*—*l*— by which it rests upon the bottom of the kettle, and from the radial arms of the spider depend hooks —*h*—*h*—*h*— onto which to hang the cup as shown.

To allow the cup to be used without the spider when desired or necessary I provide the cup with a suitable base —*b*— by which it is supported on the bottom of the kettle. Said base may be formed either integral with the cup or separate from the cup as indicated by dotted lines in Fig. 2 of the drawings. In either case said base adapts the cup to serve the cooked egg contained therein on the table.

The great advantage of my invention consists in its permitting the egg to be served in the cup in which it was cooked removed from its natural shell, thereby avoiding the custom of breaking the shell at the table and the liability of mixing pieces of the shell with the eatable portions of the egg when soft boiled, and also obviates the necessity of putting the cooked egg in a cold cup or other cold dish on the table.

Having described my invention, what I claim as new, and desire to secure by Letters Patent, is—

1. The improved egg-cup consisting of the receptacle —*a*— formed egg-shape internally, the removable cover —*c*— connected to said receptacle by interlocking couplings and provided with the eye —*e*— for the reception of a hook by which to suspend or lift the cup as set forth.

2. The combination with the egg-shaped receptacle —*a*— of the base —*b*— and the cover —*c*— connected to said receptacle by interlocking couplings and provided with the eye —e—, substantially as described and shown.

3. The egg-shaped receptacle —a— having the cover —c— connected to it by interlocking couplings and provided with the eye —e— in combination with the spider —d— provided with legs —l—l— and hooks —h—h—, substantially as described and shown.

In testimony whereof I have hereunto signed my name this 4th day of March, 1893.

WILLIAM R. HILL. [L. S.]

Witnesses:
MARK W. DEWEY,
C. L. BENDIXON.